(12) United States Patent
Kim et al.

(10) Patent No.: US 9,432,833 B2
(45) Date of Patent: Aug. 30, 2016

(54) SCHEME FOR DISCOVERY IN A COMMUNICATION NETWORK

(71) Applicant: Samsung Electronics Co., Ltd., Suwon-si, Gyeonggi-do (KR)

(72) Inventors: Kyung-Kyu Kim, Suwon-si (KR); Seung-Hoon Park, Seoul (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/279,507

(22) Filed: May 16, 2014

(65) Prior Publication Data

US 2014/0341132 A1 Nov. 20, 2014

(30) Foreign Application Priority Data

May 16, 2013 (KR) ........................ 10-2013-0055759

(51) Int. Cl.
*H04W 80/04* (2009.01)
*H04W 8/00* (2009.01)

(52) U.S. Cl.
CPC .................................. *H04W 8/005* (2013.01)

(58) Field of Classification Search
CPC ... H04W 80/04; H04W 28/04; H04W 72/04; H04W 88/06; H04W 8/005; H04W 4/008; H04W 48/08; H04W 52/0225; H04W 48/18
See application file for complete search history.

(56) References Cited

U.S. PATENT DOCUMENTS

| 2009/0323647 A1 | 12/2009 | Park et al. |
| 2011/0103344 A1 | 5/2011 | Gundavelli et al. |
| 2013/0159522 A1* | 6/2013 | Hakola ............... H04L 63/0823 709/225 |
| 2014/0056220 A1* | 2/2014 | Poitau ................. H04W 40/246 370/328 |
| 2014/0056293 A1 | 2/2014 | Kumar et al. |
| 2014/0066018 A1* | 3/2014 | Zhu ........................ H04W 4/008 455/411 |
| 2014/0162671 A1* | 6/2014 | Kim .................. H04W 52/0212 455/452.1 |
| 2014/0194115 A1* | 7/2014 | Yang ..................... H04W 4/008 455/426.1 |
| 2014/0302784 A1* | 10/2014 | Kim ...................... H04W 8/005 455/41.2 |
| 2014/0342735 A1* | 11/2014 | Liao ....................... H04W 8/04 455/435.1 |
| 2014/0342747 A1* | 11/2014 | Lee ....................... H04L 5/0053 455/450 |

(Continued)

FOREIGN PATENT DOCUMENTS

KR 1020120083516 A 7/2012

OTHER PUBLICATIONS

Erik Dahlman et al., "Design Aspects of Network Assisted Device-to-Device Communications." IEEE, May 2011.

*Primary Examiner* — Andrew Lee
(74) *Attorney, Agent, or Firm* — Jefferson IP Law, LLP

(57) ABSTRACT

A method for performing discovery at a terminal in a communication system is provided. The method includes generating a discovery request message including discovery target information, transmitting the discovery request message to a Proximity Service (ProSe) server that is located in a core network of the communication system and that manages communication of the terminal, and receiving a result of a discovery operation from another entity that performs the discovery operation of the terminal using discovery identification information about the terminal. The other entity is selected based on the discovery target information by the ProSe server.

29 Claims, 9 Drawing Sheets

(56) References Cited

U.S. PATENT DOCUMENTS

| | | | |
|---|---|---|---|
| 2014/0378123 A1* | 12/2014 | Stojanovski | H04L 5/0062 455/422.1 |
| 2015/0049635 A1* | 2/2015 | Lee | H04W 8/005 370/254 |
| 2015/0079899 A1* | 3/2015 | Hakola | H04L 67/16 455/39 |
| 2015/0131571 A1* | 5/2015 | Fodor | H04W 8/005 370/329 |
| 2015/0245192 A1* | 8/2015 | Wu | H04W 8/005 370/329 |

* cited by examiner

SCHEME FOR DISCOVERY IN A COMMUNICATION NETWORK

CROSS-REFERENCE TO RELATED APPLICATION(S)

This application claims the benefit under 35 U.S.C. §119(a) of a Korean patent application filed on May 16, 2013 in the Korean Intellectual Property Office and assigned Serial number 10-2013-0055759, the entire disclosure of which is hereby incorporated by reference.

TECHNICAL FIELD

The present disclosure relates to a scheme for discovery. More particularly, the present disclosure relates to a remote discovery method and apparatus in a communication network.

BACKGROUND

Device-to-Device (D2D) communication, which has recently emerged, refers to communication between devices via a direct link without intervention of a network entity such as a Base Station (BS).

A device supporting D2D service (e.g., a D2D device) acquires synchronization with a neighbor D2D device, detects or discovers the neighbor D2D device at a predetermined time in predetermined resources, and acquires device information about the discovered neighbor D2D device.

The device information may include identification information, interest information, and application program information about the neighbor D2D device. If the D2D device interacts with a BS, the D2D device discovers the neighbor D2D device at a time set by the BS in resources pre-allocated by the BS.

There are two types of D2D discovery schemes, stand-alone discovery (e.g., discovery without assistance from a network) and BS-assisted or network-assisted discovery. The stand-alone discovery scheme is advantageous in that a D2D device can acquire real-time information about a neighbor D2D device by transmitting a discovery signal around the D2D device.

According to the network-assisted discovery scheme, an assistant node such as a BS repeatedly transmits a discovery signal to neighbor D2D devices, thereby expanding discovery coverage and efficiently managing the energy of a D2D device. The assistant node transmits the discovery signal on behalf of the D2D device in an empty time interval (e.g., a non-signal transmission time interval) of a discovery period.

The stand-alone discovery scheme supports only limited coverage in view of hardware constraints imposed on a D2D device. In contrast, the network-assisted discovery scheme focuses only on the increase of energy efficiency and coverage expansion by simply repeating transmission of a discovery signal on behalf of a D2D device at an assistant node such as a BS in a communication network.

Various coverage areas of broadband networks such as cellular communication networks are interconnected around the world and thus a D2D device allowed to access a mobile communication network can perform discovery using a network entity (e.g., a BS) located in another region. Nonetheless, no discovery scheme using such a network entity has been specified.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a Device-to-Device (D2D) discovery method for acquiring real-time, locally customized information, while overcoming geographical limitations that a conventional D2D discovery operation suffers, by using the omni-directional coverage of a broadband network.

Another aspect of the present disclosure is to provide a method for implementing a Base Station (BS)-assisted or network-assisted discovery scheme even in a legacy terminal, thereby increasing the number of terminals participating in D2D discovery and thus increasing the efficiency of the D2D discovery.

Another aspect of the present disclosure is to provide a method for performing discovery using another entity on behalf of a roaming terminal.

In accordance with an aspect of the present disclosure, a method for performing discovery at a terminal in a communication system is provided. The method includes generating a discovery request message including discovery target information, transmitting the discovery request message to a Proximity Service (ProSe) server that is located in a core network of the communication system and that manages communication of the terminal, and receiving a result of a discovery operation from another entity that performs the discovery operation of the terminal using discovery identification information about the terminal. The other entity is selected based on the discovery target information by the ProSe server.

In accordance with another aspect of the present disclosure, a method for supporting discovery of a terminal at a ProSe server that is located in a core network of a communication system and manages communication of the terminal is provided. The method includes receiving a discovery request message including discovery target information from the terminal, selecting another entity for performing a discovery operation of the terminal based on the discovery target information and discovery identification information about the terminal, and transmitting a discovery indication message to the selected entity which requests that the selected entity perform the discovery operation of the terminal.

In accordance with another aspect of the present disclosure, a method for performing discovery at an entity in a communication system is provided. The method includes receiving a discovery indication message requesting a discovery operation from a ProSe server that is located in a core network of the communication system and manages of a terminal, and transmitting a first discovery signal to another terminal using discovery identification information included in the discovery indication message.

In accordance with another aspect of the present disclosure, a terminal for performing discovery at a terminal in a communication system is provided. The terminal includes a controller configured to generate a discovery request message including discovery target information, to control transmission of the discovery request message to a ProSe server that is located in a core network of the communication system and that manages communication of the terminal, and to control reception of a result of a discovery operation from another entity that performs the discovery operation of the terminal using discovery identification information about the terminal, and a transceiver configured to transmit and receive wireless signals under control of the controller. The other entity is selected based on the discovery target information by the ProSe server.

In accordance with another aspect of the present disclosure, a ProSe server for supporting discovery of a terminal is provided, the ProSe server being located in a core network of a communication system and managing communication of the terminal. The ProSe server includes a controller configured to control reception of a discovery request message including discovery target information from the terminal, to select another entity for performing a discovery operation of the terminal based on the discovery target information and discovery identification information about the terminal, and to control transmission of a discovery indication message to the selected entity which requests that the selected entity perform the discovery operation of the terminal, and a transceiver for transmitting and receiving wireless signals under control of the controller.

In accordance with another aspect of the present disclosure, an entity for performing discovery in a communication system is provided. The entity includes a controller configured to control reception of a discovery indication message requesting a discovery operation from a ProSe server that is located in a core network of the communication system and that manages of a terminal, and to control transmission of a first discovery signal to another terminal using discovery identification information included in the discovery indication message, and a transceiver for transmitting and receiving wireless signals under control of the controller.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
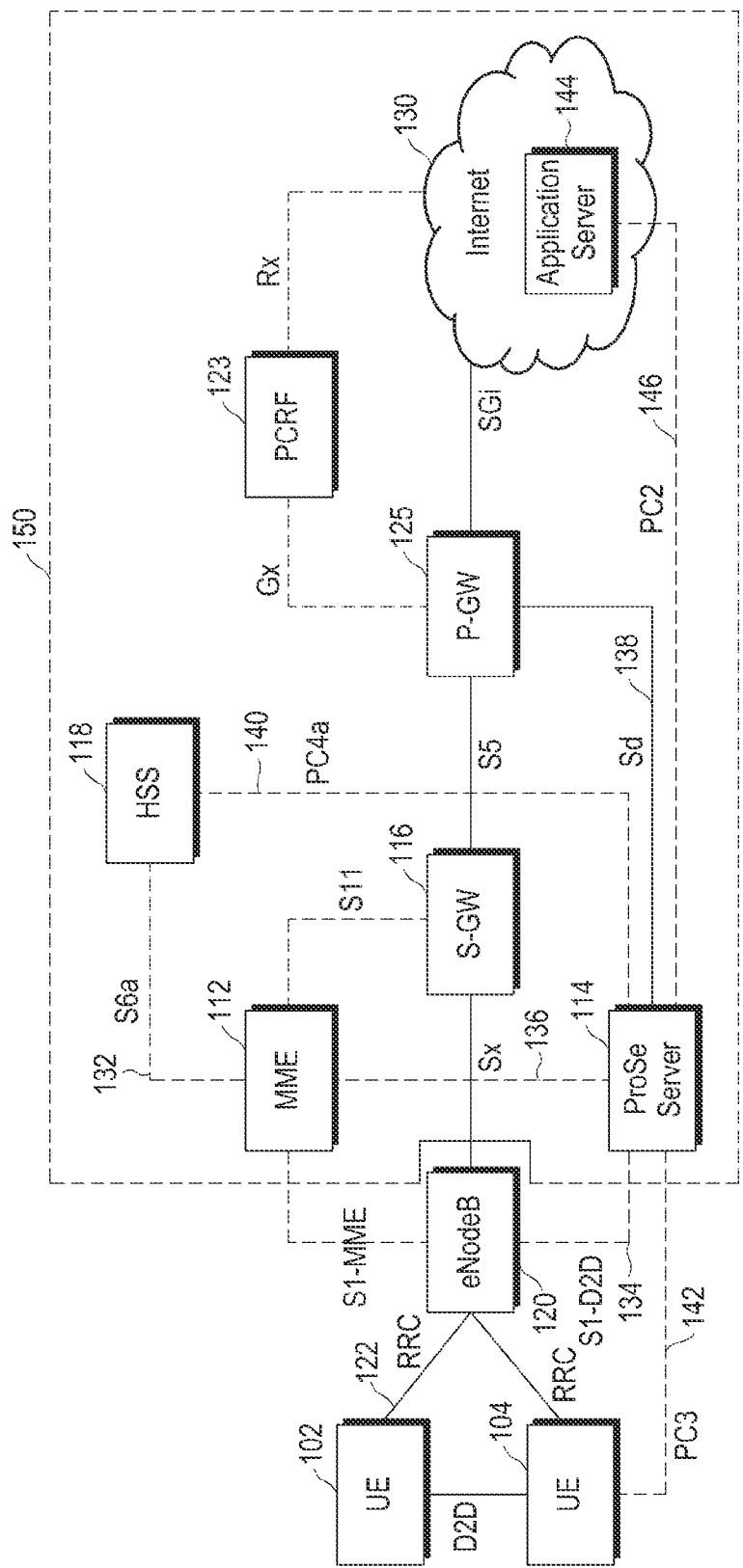
FIG. 1 is a block diagram of a broadband communication network supporting Device-to-Device (D2D) discovery according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, however, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

A Base Station (BS) is an entity that communicates with a User Equipment (UE). The term BS is interchangeably used with Node B, evolved Node B (eNB or eNode B), Access Point (AP), and the like.

A UE is an entity that communicates with a BS. The UE may be an electronic device. The term UE is interchangeably used with Mobile Station (MS), Mobile Equipment (ME), device, terminal, and the like. Unless specifically distinguished from a legacy UE, a UE as used herein refers to a Device-to-Device (D2D) UE. To make it clear that the UE is Proximity Service (ProSe)-enabled, the UE may also be referred to as a ProSe UE. When needed, a legacy UE may be mentioned as a legacy UE. The UE may include an application area with one or more applications and a D2D agent for conducting D2D communication. The D2D agent may also be referred to as a ProSe agent.

Discovery may also be referred to as ProSe discovery. Discovery may include a 'gathering-type' or 'tracking-type' operation for collecting intended information (e.g., search for famous restaurants) from other UEs by a discovery entity and a 'discovery-type' operation for transmitting intended information (e.g., an advertisement) to other UEs.

An agent entity may be named as various names such as a remote agent, a proxy, a ProSe proxy, an avatar, an agent or agency, a ghost, a ProSe agent, and the like. An entity that performs the same discovery in a remote place as done by the discovery entity (e.g., a UE) is an agent entity. The agent entity may be any device as long as the device is D2D communication-enabled. The agent entity can build a trust relationship with a ProSe server, such as an eNB, a UE, an AP, a kiosk having communication functionality, an electronic board having communication functionality, and/or the like. For example, the agent entity may be authenticated with another device (e.g., the ProSe server, the eNB, the UE, the AP, the kiosk having communication functionality, and/ or the like). Although 'ProSe agent' may refer to both an agent included in a UE as a discovery entity and an agent entity, the ProSe agents may be distinguished from each other according to respective locations and roles of the ProSe agents.

A ProSe server may also be referred to as a D2D controller, a ProSe function, and the like.

A discovery code is information that identifies a UE or an application. Depending on the type of a discovery operation, a discovery code may identify a UE that gathers information or a UE that advertises information.

Although the following description will be given in the context of a Long Term Evolution (LTE) system as an example of a broadband wireless access system, it is to be clearly understood that various embodiments of the present disclosure are applicable to any system requiring or otherwise facilitating message transmission and reception between an access network and a UE.

FIG. 1 is a block diagram of a broadband communication network supporting D2D discovery according to an embodiment of the present disclosure.

Referring to FIG. 1, network entities supporting D2D discovery and a reference model for the network entities in a cellular broadband mobile communication system will be described below.

Referring to FIG. 1, a broadband mobile communication system may include at least one of UE 102 and UE 104, at least one eNB 120 that may establish radio bearers with the UE 102 and the UE 104, a Mobility Management Entity (MME) 112 that manages the mobility of the UE 102 and the UE 104, a ProSe server 114 that controls D2D communication of the UE 102 and the UE 104, a Serving GateWay (S-GW) 116 that connects the UE 102 and the UE 103 to an external network, a Packet GateWay (P-GW or PDN-GW) 125 that connects the S-GW 116 to an Internet Protocol (IP) network 130 (e.g., the Internet) including an application server 144, a Home Subscriber Server (HSS) 118 that manages subscriber profiles of the UE 102 and UE 104 and that provides the subscriber profiles to the MME 112, and a Policy and Charging Rule Function (PCRF) 123 located between the P-GW 125 and the IP network 130, which generates and manages a Policy and Charging Control (PCC) rule for a mobile communication service.

The UE 102 and the UE 104 are D2D UEs equipped with D2D functionality. Because the UE 102 and the UE 104 have a broadband mobile communication function, the UE 102 and the UE 104 may access the same or different eNBs. For example, the UE 102 and the UE 104 may be configured to establish a D2D interface 100 for D2D communication between each other and may be located in a cell covered by the single eNB 120 or cells covered by different eNBs. At least one of the UE 102 and the UE 104 may access a core network 150 of the broadband mobile communication system through the eNB 120 and may receive support of D2D communication from the core network 150.

The core network 150 of the broadband mobile communication system (e.g., an Evolved Packet Core (EPC) of an LTE system) may include the MME 112 and the ProSe server 114. The core network 150 provides a mobile communication service to the UE 102 and the UE 104 through the eNB 120. According to various embodiments of the present disclosure, the core network 150 may determine the proximity of a ProSe-enabled UE and may indicate to UEs whether the ProSe-enabled UE is close (e.g., may indicate to the UEs whether the ProSe-enabled UE is within proximity to the corresponding UEs).

The eNB 120 manages and controls radio resources within the cell thereof. Specifically, the eNB 120 controls radio bearers, accepts a radio request, and performs functions such as dynamic radio resource management, load balancing, and inter-cell interference control. The eNB 120 may establish Radio Resource Control (RRC) interfaces 122 to exchange control signals with the UE 102 and the UE 104.

The D2D interface 100 for D2D communication between the UE 102 and the UE 104 may define the UE 102 and the UE 104 as end points of D2D communication. The D2D interface 100 may be used to exchange control messages or data needed for D2D communication between the UE 102 and the UE 104. At least one of the UE 102 and the UE 104 may have an RRC interface 122 separately from the D2D interface 100 in order to connect to the eNB 120. The D2D interface 100 and the D2D interface 122 may operate independently or mutually dependently of each other.

The MME 112 is an entity that manages the mobility of the UE 102 and the UE 104 through the eNB 120. Optionally, the MME 112 may incorporate the functionality of the S-GW 116 that controls the mobile communication service for the UE 102 and the UE 104 according to one aspect of the system. Specifically, the MME 112 may incorporate the function of connecting the UE 102 and the UE 104 to the IP network 130 through the P-GW 125 from among the functions of the S-GW 116.

The MME 112 supports functions such as handover or paging and performs functions such as UE authentication, security key management, and roaming via a connection to the HSS 118. To perform the above functions, the MME 118 may exchange Non-Access Stratum (NAS) signals with the UE 102 and the UE 104.

The MME 112 is connected to the HSS 118 via an S6a interface 132. Optionally, the MME 112 may receive subscriber information and security information needed to support D2D communication from the HSS 118 via the S6a interface 132 and provide the received subscriber information and security information to the ProSe server 114.

The S-GW 116 distributes data to the eNB 120 managed by the S-GW 116 and serves as an anchoring point for handover of a UE between eNBs.

The P-GW 125 supports connectivity between the UE 102 and the UE 104 and the IP network 130, provides a packet polling function, assigns IP addresses to the UE 102 and the UE 104, and charges the UE 102 and the UE 104 according to the PCC rule provided by the PCRF 123.

The ProSe server 114 is an entity that controls and manages D2D communication for the UE 102 and the UE 104. The ProSe server 114 may be located at the core of the broadband network. The ProSe server 114 may perform functions such as D2D registration management, D2D discovery information management, interest matching, and/or the like. The ProSe server 114 may be a logical entity. The ProSe server 114 may be connected directly to the HSS 118 and may receive subscriber information and security information needed to support D2D communication from the HSS 118 via a PC4a interface 140. The ProSe server 114 may be an independent entity. According to various embodiments of the present disclosure, the ProSe server 114 may be incorporated with another network entity, for example, the MME 112.

The ProSe server 114 performs the following two functions: provisioning, and matching.

One of the two functions is provisioning. The ProSe server 114 stores a D2D service policy according to a system operator, authenticates the D2D function of UEs, authorizes the UEs, and assists to charge the UEs.

The other function is matching. The ProSe server 114 supports a search for another D2D UE or discovery of intended information. According to various embodiments of the present disclosure, the ProSe server 114 manages a code list and allocates one or more codes of the code list to a UE in response to a discovery code request received from the UE, so that the UE may use the codes during discovery. According to various embodiments of the present disclosure, the ProSe server 114 may be connected to the eNB 120 via an S1 interface 134. The S1 interface 134 is referred to as an S1-D2D interface. According to various embodiments of the present disclosure, the ProSe server 114 may be connected directly to the UE 104 via a PC3 interface 142. The PC3 interface 142 may be an IP-based user-plane transmission path through which a discovery request message and other control messages may be exchanged between the ProSe server 114 and the UE 104. The ProSe server 114 may be connected directly to an application server 144 via a PC2 interface 146.

The ProSe server 114 may also be connected to the MME 112 of the broadband mobile communication network. Herein, an Sx interface 136 may be used. The Sx interface 136 enables the ProSe server 114 to acquire user information about the UE 102 and the UE 104 from the HSS 118 through the MME 112. Further, the ProSe server 114 may be connected to the P-GW 125 via an Sd interface 138 and thus may receive IP data (e.g., user-plane data).

The eNB 120 may be connected to the MME 112 through an S1-MME interface. The MME 112 may be connected to the S-GW 116 through an S11 interface. The S-GW 116 may be connected to the P-GW 125 through an S5 interface. The P-GW 125 may be connected to the PCRF 123 through a Gx interface. The PCRF 123 may be connected to the Internet 130 through an Rx interface. The P-GW 125 may be connected to the Internet 130 through an SGi interface.

A UE generates and transmits a signal using information received from the ProSe server 114 (e.g., a discovery code) and radio resources allocated by the ProSe server 114. Neighbor UEs around the UE may detect and decode the signal transmitted by the UE, thereby discovering the UE. In a discovery scheme using a discovery signal transmitted from a UE, the discovery coverage of each UE is determined based on the location of the UE and affected by the power capability of the UE.

The application server 144 may be located in the IP network 130 and may transmit protocol-based information to the ProSe server 114 according to a pre-agreement for D2D communication. The ProSe server 114 may use the information received from the application server 144 in generating a code.

Figure 2:
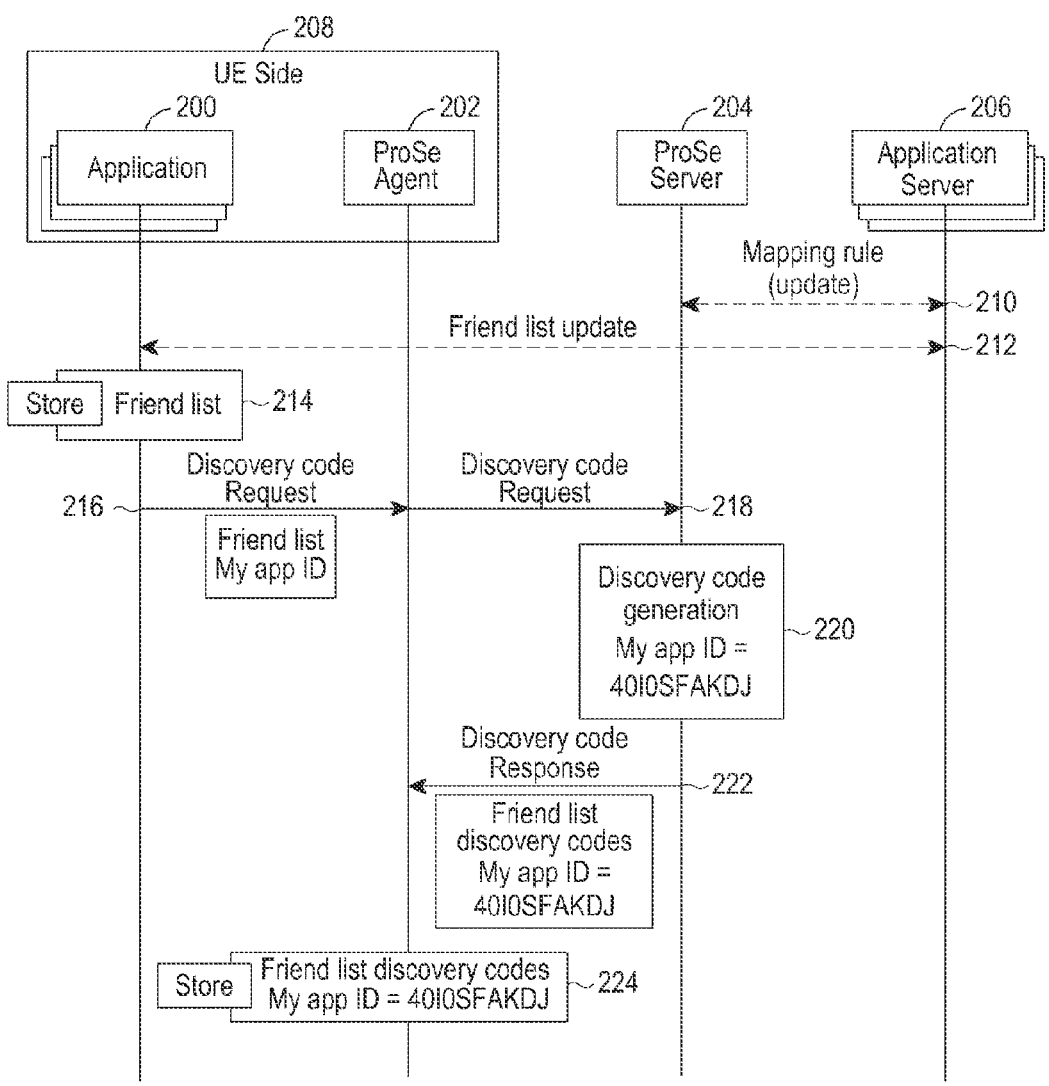
FIG. 2 is a diagram illustrating a signal flow for a method for allocating a discovery code to a D2D User Equipment (UE) by a Proximity Service (ProSe) server according to an embodiment of the present disclosure.

FIG. 2 is a diagram illustrating a signal flow for a method for allocating a discovery code to a D2D UE by a ProSe server according to an embodiment of the present disclosure.

Referring to FIG. 2, a D2D UE 208 may include at least one application 200 and a ProSe agent 202. The application 200 is an end point that receives a user command through a user interface and executes the received user command. The ProSe agent 202 receives a signal generated from the application 200 and converts the received signal to a form transmittable by a broadband communication protocol. For example, the ProSe agent 202 may include middleware between the application 200 and the broadband communication protocol. The application 200 and the ProSe agent 202 may be collectively referred to as the UE or UE side 208.

At operation 210, a ProSe server 204 and an application server 206 may exchange a mapping rule with each other, for code allocation and may update the mapping rule periodically or upon occurrence of an event. The ProSe 204 may collect information about each application (e.g., an Application ID (App ID)) by exchanging the mapping rule and allocate a code using the collected information.

At operation 212, the application server 206 may update necessary information periodically or upon occurrence of an event by communicating with the application 200 of the UE 208. Therefore, the ProSe 204 may achieve the effect of synchronizing with latest information about the UE 208. According to various embodiments of the present disclosure, a friend list may be checked and updated periodically.

At operation 214, the application 200 of the UE 208 stores the updated friend list in a storage space.

Upon generation of a discovery command in the application 200, the UE 208 requests assistance to the ProSe server 204 to acquire information needed to discover its surroundings. Specifically, at operation 216, the application 200 transmits a Discovery Code Request message including the friend list and an App ID to the ProSe agent 202. Optionally, the Discovery Code Request message may further include a UE ID of the UE 208.

At operation 218, the ProSe agent 202 determines the App ID and transmits a Discovery Code Request message including the received list (e.g., the friend list) to the ProSe 204 to thereby request allocation of a discovery code.

At operation 220, upon receipt of the Discovery Code Request message from the UE 208, the ProSe server 204 generates (or allocates) a discovery code that identifies the application 200 of the UE 208 (e.g., App ID='4110SFAKDJ').

At operation 222, the ProSe server 204 may transmit discovery codes of one or more other UEs that are performing or will perform discovery within coverage thereof in the friend list included in the Discovery Code Request message as well as the discovery code of the UE 208 in a Discovery Code Response message to the UE 208.

At operation 224, upon receipt of the Discovery Code Response message, the ProSe agent 202 stores the codes included in the Discovery Code Response message (e.g., the discovery code of the UE 208 or the discovery codes of the other UEs performing or supposed to perform discovery). The UE 208 may use the stored discovery codes to discover other UEs or announce itself during discovery.

Figure 3A:
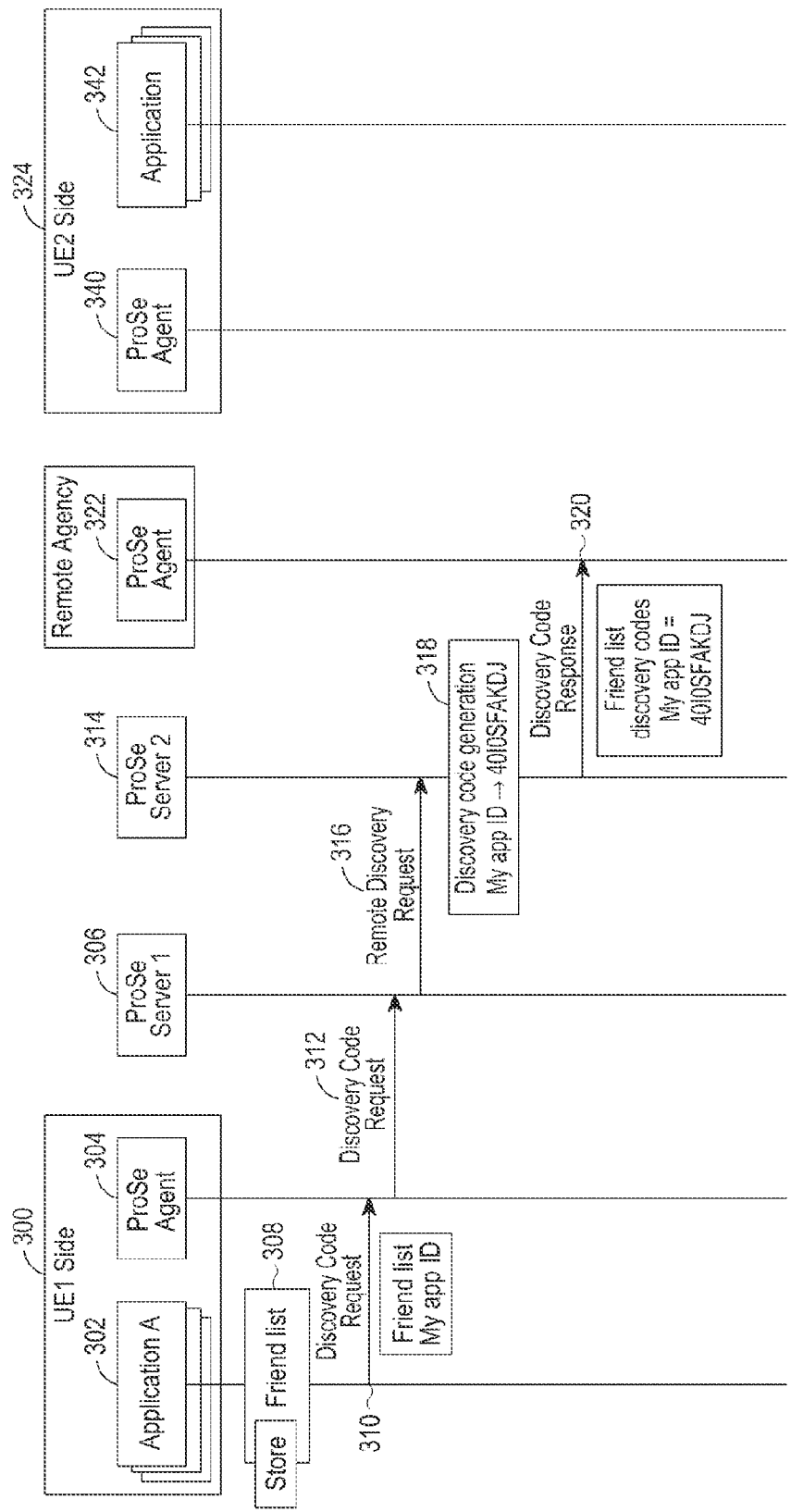
FIGS. 3A and 3B are diagrams illustrating a signal flow for a method for performing discovery using an agent entity on behalf of a D2D UE according to an embodiment of the present disclosure.
Figure 3B:
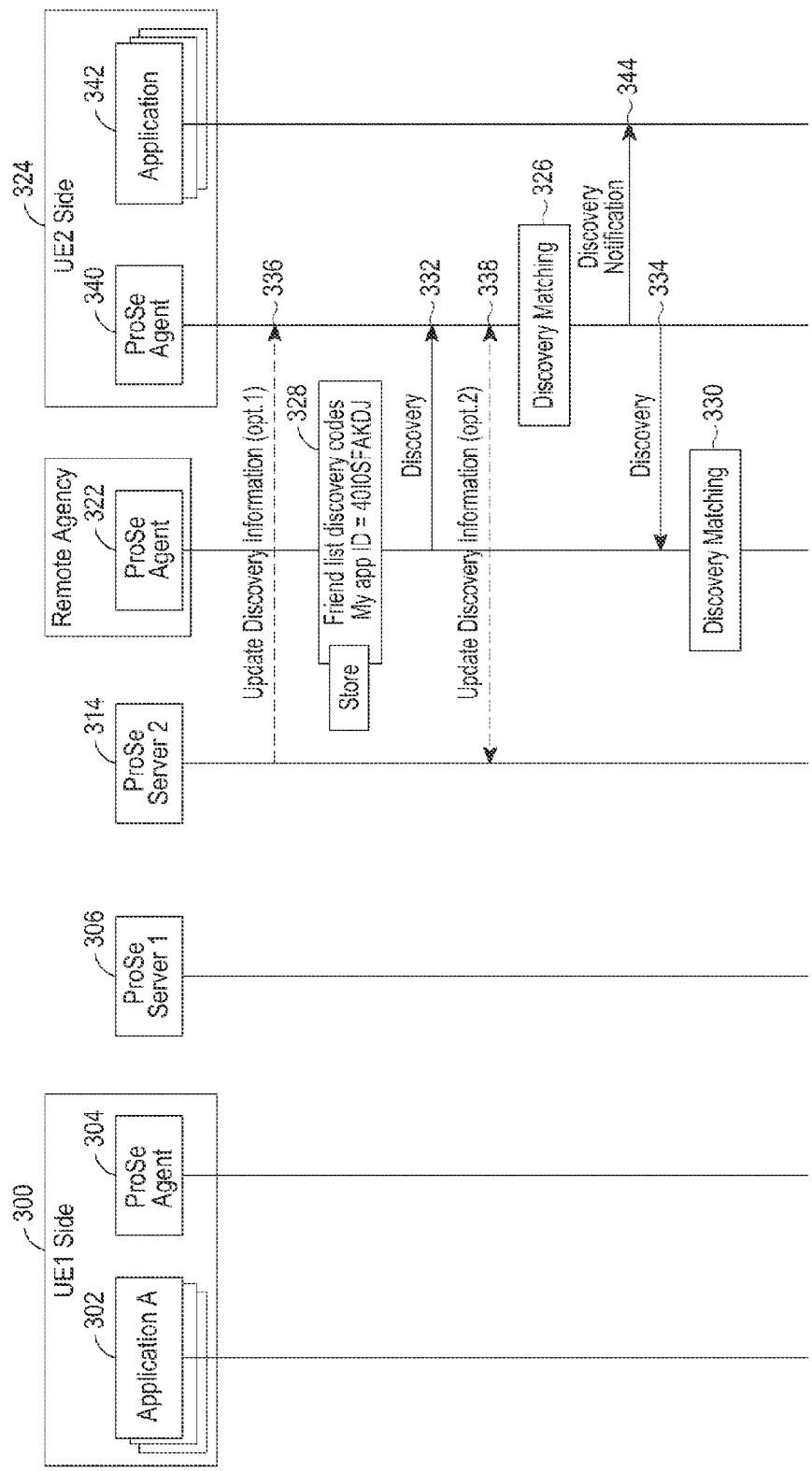

FIGS. 3A and 3B are diagrams illustrating a signal flow for a method for performing discovery using an agent on behalf of a D2D UE according to an embodiment of the present disclosure.

Referring to FIGS. 3A and 3B, although there are at least one application 302 and a ProSe agent 304 in a first UE (UE1) 300, the application 302 and the ProSe agent 304 will be collectively referred to as the UE1 or UE1 side 300. The application 302 is an end point for receiving a user command through a user interface and executing the user command. The ProSe agent 304 may receive a signal generated from the application 302 and may convert the received signal to a form transmittable by broadband communication according to a broadband communication protocol. For example, the ProSe agent 304 may include middleware between the application 302 and the broadband communication protocol.

At operation 308, the application 302 of the UE 300 stores necessary information to be used. For example, a friend list, a group ID, bookmarked addresses, and/or the like may be stored in the application 302.

At operation 310, upon generation of a discovery command, the application 302 transmits a Discovery Code Request message to the ProSe agent 304.

At operation 312, the UE1 300 requests assistance to a first ProSe server (ProSe server 1) 306 by transmitting a Discovery Code Request message in order to request information needed to discover surroundings thereof.

Discovery may be performed using another entity (e.g., an agent entity) based on the decision of the ProSe agent 304 or an arbitrary criterion according to various embodiments of the present disclosure. The arbitrary criterion may be geographical proximity, request of an application or a user, the decision of the ProSe agent 304, and/or the like. For example, upon receipt of the Discovery Code Request message from the application 302, the ProSe agent 304 determines whether a target geographical location for discovery is close to the ProSe agent 304. If the target geographical location for discovery is not close to the ProSe agent 304, the ProSe agent 304 may determine to use an agent entity and request agent-based discovery to the ProSe server 1 306.

If the arbitrary criterion is satisfied and the ProSe agent 304 determines to perform discovery using the agent entity, then at operation 312, the ProSe agent 304 transmits a Discovery Code Request message to the ProSe server 1 306. The Discovery Code Request message may include the APP ID of the UE 300 and a list of UE IDs to be discovered, such as a friend list.

Specifically, the Discovery Code Request message may include, for example, all or a part of Information Elements (IEs) such as Remote Agent Command, Discovery Target Information, and Discovery Information. The Discovery Target Information may include location-related information.

The Remote Agent Command includes information about the category (or type) of a discovery operation that the agent entity will perform. The discovery operation may be a gathering-type operation for listening to or collecting information from the surroundings or a discovery-type operation for transmitting information to the surroundings. The Remote Agent Command may be configured to indicate more categories or types of discovery operations. The gathering-type operation may be referred to as a tracking-type operation because such operations are similar.

The location-related information refers to geographical information about a target discovery area and may include information such as GPS information or an address (e.g., an administrative address). When needed, the Discovery Target Information may specify an entity that will serve as a remote agent by including at least one of the location-related information and a target ID. For example, the target ID may be at least one of an App ID, a ProSe user group ID, and a phone number of a D2D UE.

The Discovery Information may include various types of information related to an application, for example, an App ID or a user ID. The Discovery Information may further include information that may be converted in various manners according to an application, such as buy, sell, coupon information, and/or the like. The Discovery Information may be represented as plain text or code. The application-related information (e.g., the App ID) that may be included in the Discovery Information may affect an active operation (e.g., information filtering) of a remote agent.

Upon receipt of the Discovery Code Request message, the ProSe server 1 306 may recognize that the UE 300 wants agent-based discovery by interpreting the Remote Agent Command field and may select an agent entity based on the Discovery Target Information.

If the location-related information being an example of the Discovery Target Information indicates a location within the area managed by the ProSe server 1 306, the ProSe server 1 306 selects an agent entity, taking into account a geographical condition or load balancing. For example, the ProSe server 1 306 selects an entity located in a target discovery area as an agent entity. In the case of an indoor agent entity, the ProSe server 1 306 may select the indoor agent entity referring to a database registered to the ProSe server 1 306.

Optionally, at operation 316, if the location-related information indicates a location outside the coverage of the ProSe server 1 306, the ProSe server 1 306 may request selection of an agent entity for discovery to a second ProSe server (ProSe server 2) 314 that covers the location indicated by the location-related information by transmitting a Remote Discovery Request message. The Remote Discovery Request message may include information included in the Discovery Code Request message. Upon receipt of the Remote Discovery Request message, the ProSe server 2 314 may select an agent entity according to the same criterion as used in the ProSe server 1 306.

Figure 8A:
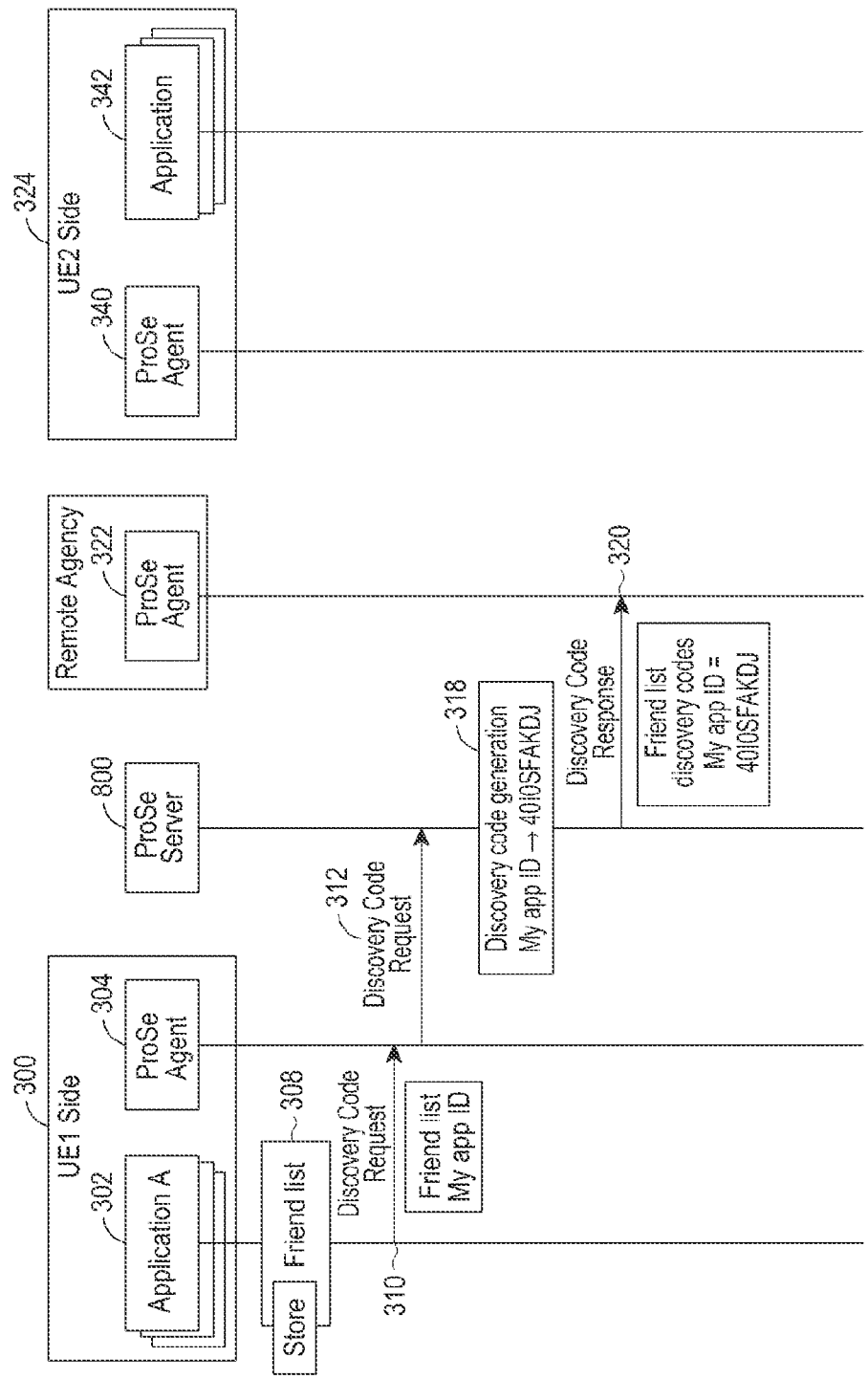
FIGS. 8A and 8B are diagrams illustrating a signal flow for a method for performing discovery using an agent entity on behalf of a D2D UE according to an embodiment of the present disclosure.
Figure 8B:
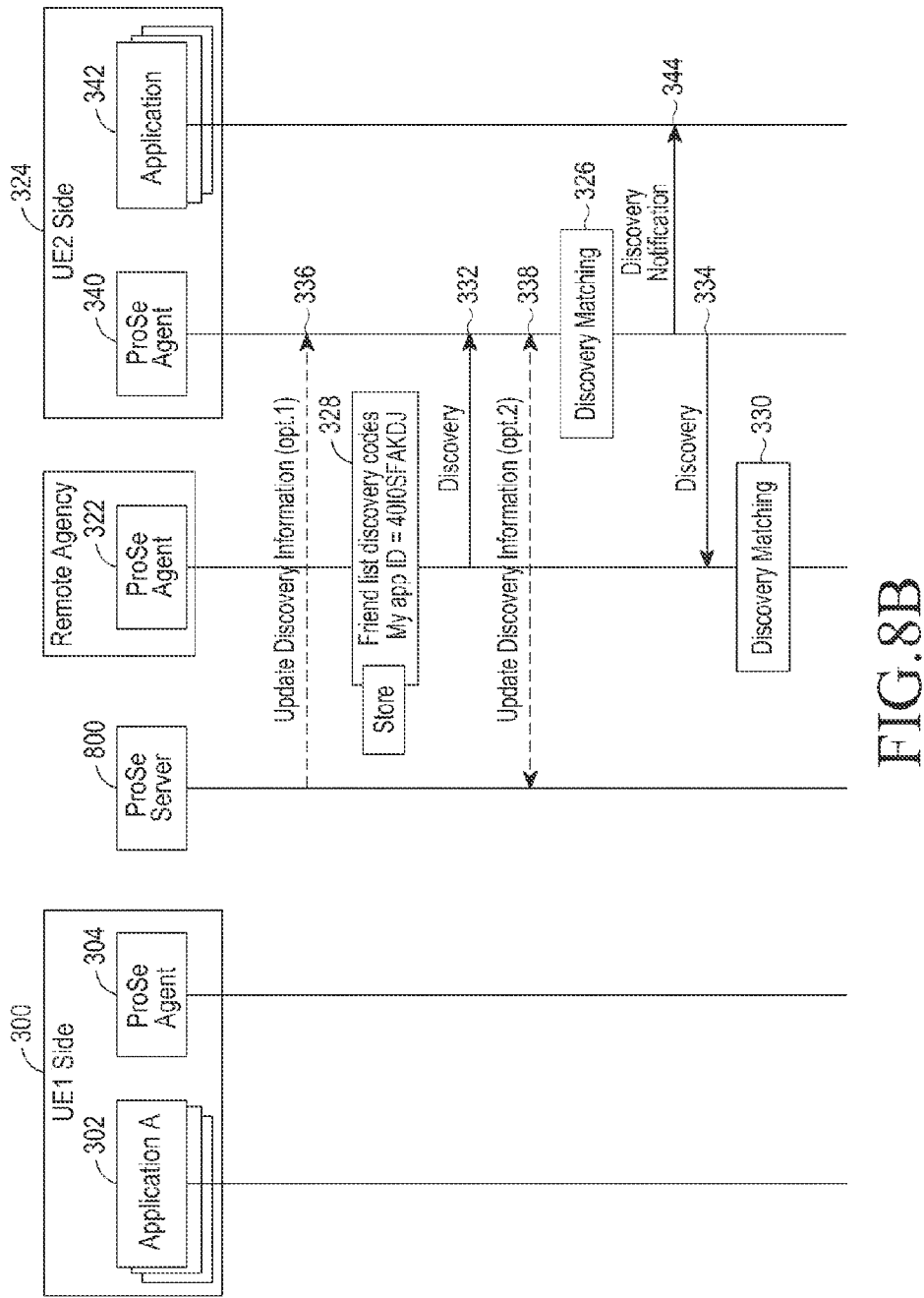

If the ProSe server 2 314 is not needed, all operations of the ProSe server 2 314 as described below may be interpreted as performed by the ProSe 1 server 306. An embodiment in which the ProSe server 2 314 is not needed is illustrated in FIGS. 8A and 8B.

At operation 318, the ProSe server 2 314 generates a discovery code for the agent entity based on the information included in the Remote Discovery Request message (e.g., the information included in the Discovery Code Request message). At operation 320, the ProSe server 2 314 transmits a Discover Code Response message including the generated discovery code to a selected agent entity 322. The agent entity 322 may be any D2D device (e.g., an eNB, a UE, an AP, and/or the like) with which a trust relationship has been established with the ProSe server 2 314, irrespective of the type of the D2D device.

As described before, the Discovery Target Information may include at least one of location-related information, an App ID, a ProSe user group ID, and a phone number of a D2D UE. Specific embodiments of the present disclosure using the above information as the Discovery Target Information will be described below.

First, an App ID or a ProSe group ID known to the ProSe server 306 or the ProSe server 2 314 may be used as the Discovery Target Information. The ProSe server 306 or the ProSe server 2 314 may determine the IP address of a UE corresponding to the App ID or the ProSe group ID, referring to a database that stores information. Upon receipt of the Remote Discovery Request message via the PC3 interface 142 from the UE 300, the ProSe server 306 or the ProSe server 2 314 may generate a discovery code for an agent entity using the IP address of the UE 300 based on the information included in the Remote Discovery Request message. At operation 320, the ProSe server 306 or the ProSe server 2 314 may transmit a Discovery Code Response message including the generated discovery code to the selected agent entity 322.

Second, a phone number may be used as the Discovery Target Information. The ProSe server 306 or the ProSe server 2 314 may acquire a Mobile Subscriber Integrated Services Digital Network-Number (MSIDN) or 3GPP-related ID mapped to the phone number from an HSS. Upon receipt of the Remote Discovery Request message via the PC3 interface 142 from the UE 300, the ProSe server 306 or the ProSe server 2 314 may generate a discovery code for an agent entity using the information acquired from the HSS based on the information included in the Remote Discovery Request message. At operation the ProSe server 306 or the ProSe server 314 2 may transmit a Discovery Code Response message including the generated discovery code to the selected agent entity 322.

At operation 328, upon receipt of the Discovery Code Response message, the agent entity 322 may store information included in the Discovery Code Response message. The agent entity 322 determines a basic discovery operation (e.g., gathering or discovery) as an agent by determining a Remote Agent Command included in the Discovery Code Response message.

If the discovery operation of the agent entity 322 is gathering, the agent entity 322 may listen during a discovery interval in time or frequency resources allocated for D2D communication and may actively collect information matching to listened discovery information. At operation 330, the agent entity 322 may decide as to discovery code matching in the collected information or discovery matching through a ProSe agent of the agent entity 322. In other words, the agent entity 322 may operate as the UE 300 requesting discovery, with the authorization of the UE 300.

In contrast, if the discovery operation of the agent entity 322 is discovery, then, at operation 332, the agent entity 322 transmits the discovery code thereof in the time or frequency resources allocated for D2D communication to thereby discover neighbor UEs.

The transmitted discovery code may be the discovery code of the agent entity 322 or the discovery code of another UE to be discovered, according to the usage of the discovery operation. For example, in the case of gathering, the discovery code of another UE to be discovered may be transmitted, whereas in the case of discovery, the discovery code of the agent entity 322 may be transmitted, for advertisement.

The discovery code may be added with a Remote Flag according to the present disclosure. At operation 334, if a neighbor UE 324 around the agent entity 322 discovers the discovery code of the agent entity 322 and responds after the discovery matching of operation 326, the Remote Flag indicates that the discovery code has been transmitted by the agent entity 322 (not by the UE 300). Use or non-use of the Remote Flag may be determined depending on a system configuration.

Optionally, at operation 336, after the ProSe server 306 or the ProSe server 2 314 allocates the discovery code to the agent entity 322, the ProSe server 306 or the ProSe server 2 314 may transmit the discovery code to the UE 324 within coverage thereof (e.g., perform information update), when needed. Thus, the ProSe server 306 or the ProSe server 2 314 may help the agent entity 322 to perform discovery.

According to various embodiments of the present disclosure as an example of the information update, at operation 338, when the neighbor UE 324 listens to an unknown discovery code, the neighbor UE 324 may query the ProSe server 306 or the ProSe server 2 314 and may receive a response from the ProSe server 306 or the ProSe server 2 314. This operation may vary depending on a system configuration and a used method.

The neighbor UE 324 around the agent entity 322 listens to information from surroundings thereof by participating in discovery. If the agent entity 322 performs discovery on behalf of the UE 300, the neighbor UE 324 regards the agent entity 322 as the UE 300. At operation 326, a ProSe agent 340 of the neighbor UE 324 performs the discovery matching using the listened information. At operation 344, the ProSe Agent 340 notifies an application 342 of the neighbor UE 324 of the discovery matching. In other words, the agent entity 322 may perform all discovery operations from the perspective of the UE 300, with the authorization of the UE.

At operation 330, upon discovery of a discovery code (e.g., a user ID, an App ID, and/or the like) transmitted from the neighbor UE 324, the agent entity 322 compares the received discovery code with pre-stored discovery codes (e.g., friend IDs). Thereafter, the agent entity 322 may notify the UE 300 of a matching result in various available paths.

The ProSe server 306 or the ProSe server 2 314 may process information collected from the neighbor UE 324 or the agent entity 322 and reply to the UE 300 with the processed information in response to the Discovery Code Request message received at operation 312. Alternatively or in addition, the neighbor UE 324 may transmit a response to the Discovery Code Request message of operation 312 directly to the UE 300 (not to the agent entity 322) over an IP network.

No response or ACKnowledgement (ACK) may be transmitted for a request in every discovery operation performed by an agent entity by activating a timer. Every operation may support a legacy UE without any modification.

FIGS. 8A and 8B are diagrams illustrating a signal flow for a method for performing discovery using an agent entity on behalf of a D2D terminal according to an embodiment of the present disclosure.

Referring to FIGS. 8A and 8B, the discovery method illustrated in FIGS. 8A and 8B is different from the discovery method illustrated in FIGS. 3A and 3B in that only one ProSe server 800 exists in the system, there is no transmission of a Remote Discovery Request message from the ProSe server 1 306 to the ProSe server 2 314, and the ProSe server 800 (e.g., not the ProSe server 2 314) communicates with the agent entity 322 or the neighbor UE 324. Other operations and signal flows are identical to their counterparts in FIGS. 3A and 3B and thus will not be described herein in detail.

The D2D discovery method using an agent entity as described above may be implemented in various embodiments of the present disclosure as illustrated in Table 1 below.

TABLE 1

|  | Service A | Service B | Service C | Service D |
| --- | --- | --- | --- | --- |
| Type of discovery operation | Information collection ('gathering') | Information advertisement ('discovery') | Information collection ('gathering') | Information advertisement ('discovery') |
| Agent entity (example) | BS, AP | BS, AP | UE | UE |
| Service embodiment | Restaurant search, etc. | Personal advertisement, commercials, etc. | Kids monitoring, etc. | Mobile phone detection |

Figure 4:
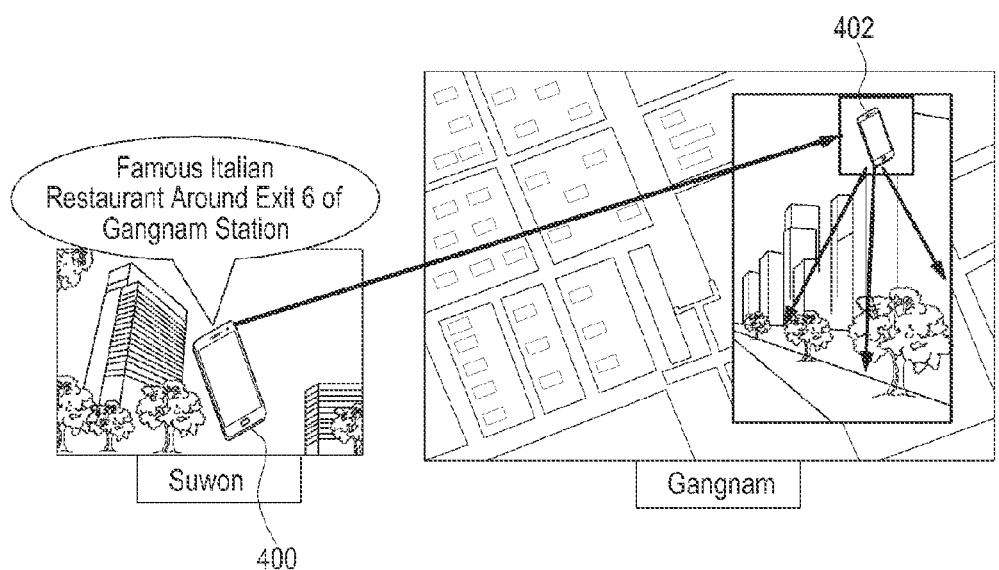
FIG. 4 illustrates an agent-based discovery service according to an embodiment of the present disclosure.

FIG. 4 illustrates an agent-based discovery service according to an embodiment of the present disclosure.

Referring to FIG. 4, according to an embodiment of the present disclosure identified in Table 1 as Service A, a user executes a "restaurant search" application for search in a remote place other than the user is located, so that a 'gathering-type' operation may be performed. For example, the user located in Suwon may execute the application to search for an Italian restaurant around Exit 6 of Gangnam Station in Seoul.

A UE 400 of the user in Suwon may collect discovery information by designating, as an agent entity, an entity (e.g., a BS, an AP, or a terminal) 402 of a broadband communication network near to Exit 6 of Gangnam Station in Seoul. When needed, a direct link may be established between the agent entity 402 and the UE 400 in the agent-based discovery method according to various embodiments of the present disclosure. Therefore, even though D2D communication is not available geographically, a user may use real-time information and proximity service without an application server.

The agent-based discovery operation of a UE illustrated in FIG. 4 may be performed as follows.

Upon D2D registration or initial execution of an application, the D2D-enabled BS/AP/UE 400 registers to a ProSe server and updates a D2D activated/deactivated state.

The user located in Suwon starts D2D discovery by executing a "restaurant.com" application through the UE 400. Information that the user wants to achieve by discovery (e.g., information of interest may be plain text such as "Italian restaurant around Exit 6 of Gangnam Station" or its coded information).

The UE 400 recognizes by GPS information or the like that the current location (Suwon) is different from a location related to interest information (Seoul). The UE 400 may request agent-based discovery by transmitting a Discovery Code Request message to the ProSe server. The Discovery Code Request message may include location-based information (e.g., GPS information, an address, and/or the like) and discovery information (e.g., an App ID, a user ID, (API-based) interest, and/or the like).

The ProSe server transmits a discovery indication message to at least one agent entity (e.g., BS, AP, or UE) 402 managed by the ProSe server, according to the location-based information included in the Discovery Code Request message.

Upon receipt of the discovery indication message, the agent entity 402 may collect discovery information from neighbor UEs or transmit a discovery signal to neighbor UEs by acting as an avatar of the UE 400. The agent-based discovery operation may be performed for a predetermined time in a time-limited manner or in an event-triggered manner (e.g., upon generation of a specific event).

The agent entity 402 feeds back the discovery information collected from the neighbor UEs to the UE 400. The feedback may be transmitted after intervention and information processing of the ProSe server or directly via an IP connection (e.g., without intervention of the ProSe server). In addition, paging may be performed to request a connection for transmission of a discovery signal received from a neighbor UE to the UE 400.

For Service B and Service D in Table 1, a discovery-type operation is performed for an advertisement, mobile phone detection, and/or the like. For service C, similar to Service A, a gathering-type operation is performed in which the movement of a child carrying a D2D UE is tracked, proximity of a malicious person to the child is warned, or the like using discovery information about the child. Further, various services including friend search may be implemented.

Figure 5:
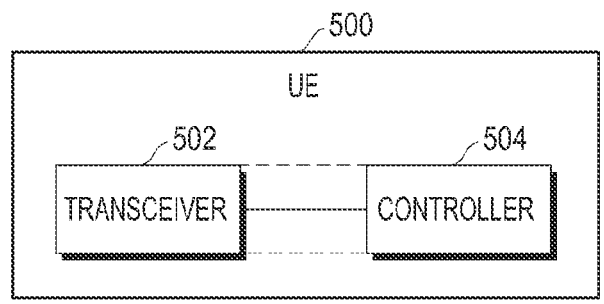
FIG. 5 is a block diagram of a UE according to an embodiment of the present disclosure.

FIG. 5 is a block diagram of a UE according to an embodiment of the present disclosure.

Referring to FIG. 5, a UE 500 includes a transceiver 502 for transmitting and receiving various types of wireless signals under the control of a controller 504. The transceiver 502 may transmit and receive signals to and from at least one entity of a broadband communication network under the control of the controller 504. In addition, the transceiver 502 may transmit and receive signals to and from a neighbor UE, for D2D communication. The controller 504 performs UE operations in the afore-described discovery method. For example, the controller 504 may include an application and a ProSe agent. Accordingly, when the controller 504 is to perform discovery for remote UEs, the controller 504 may perform an agent-based discovery method by transmitting a Discovery Code Request message to a ProSe server.

Although the transceiver 502 and the controller 504 are shown in FIG. 5 as separately configured, for the convenience of description, the transceiver 502 and the controller 504 may be incorporated into a single component.

Figure 6:
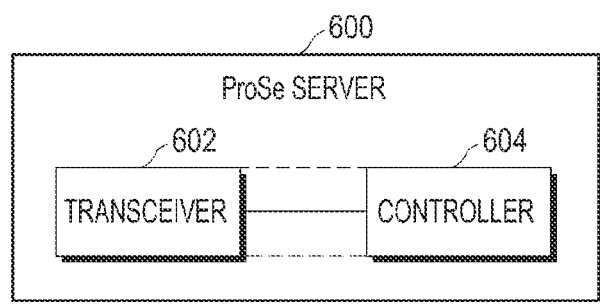
FIG. 6 is a block diagram of a ProSe server according to an embodiment of the present disclosure.

FIG. 6 is a block diagram of a ProSe server according to an embodiment of the present disclosure.

Referring to FIG. 6, a ProSe server 600 includes a transceiver 602 for transmitting and receiving various types of wireless signals under the control of a controller 604. The transceiver 602 may transmit and receive signals to and from at least one entity of a broadband communication network under the control of the controller 604. In addition, the transceiver 502 may transmit and receive signals to and from a neighbor UE within its coverage, for D2D communication. The controller 604 performs ProSe server operations in the afore-described discovery method. For example, the controller 604 may receive a signal such as a Discovery Code Request message from a UE that wants to perform discovery for remote UEs, select an agent entity, and transmit a Discovery Code Response message to the selected agent entity, thereby performing the agent-based discovery method.

Although the transceiver 602 and the controller 604 are shown in FIG. 6 as separately configured, for the convenience of description, the transceiver 602 and the controller 604 may be incorporated into a single component.

Figure 7:
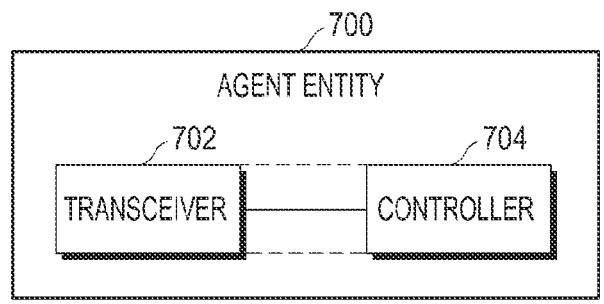
FIG. 7 is a block diagram of an agent entity according to an embodiment of the present disclosure.

FIG. 7 is a block diagram of an agent entity according to an embodiment of the present disclosure.

Referring to FIG. 7, an agent entity 700 includes a transceiver 702 for transmitting and receiving various types of wireless signals under the control of a controller 704. The transceiver 702 may transmit and receive signals to and from at least one entity of a broadband communication network under the control of the controller 704. In addition, the transceiver 702 may transmit and receive signals to and from a neighbor UE, for D2D communication. The controller 704 performs agent entity operations in the afore-described discovery method. For example, the controller 704 may receive a signal such as a Discovery Code Response signal from a ProSe server and exchange discovery signals with neighbor UEs on behalf of a UE triggering (or requesting) the discovery, thereby performing the agent-based discovery method. In addition, the controller 704 may transmit a result to the UE triggering the discovery by providing the discovery signals received from the neighbor UEs to the ProSe server.

Although the transceiver 702 and the controller 704 are shown in FIG. 7 as separately configured, for the convenience of description, the transceiver 702 and the controller 704 may be incorporated into a single component.

Figure 9:
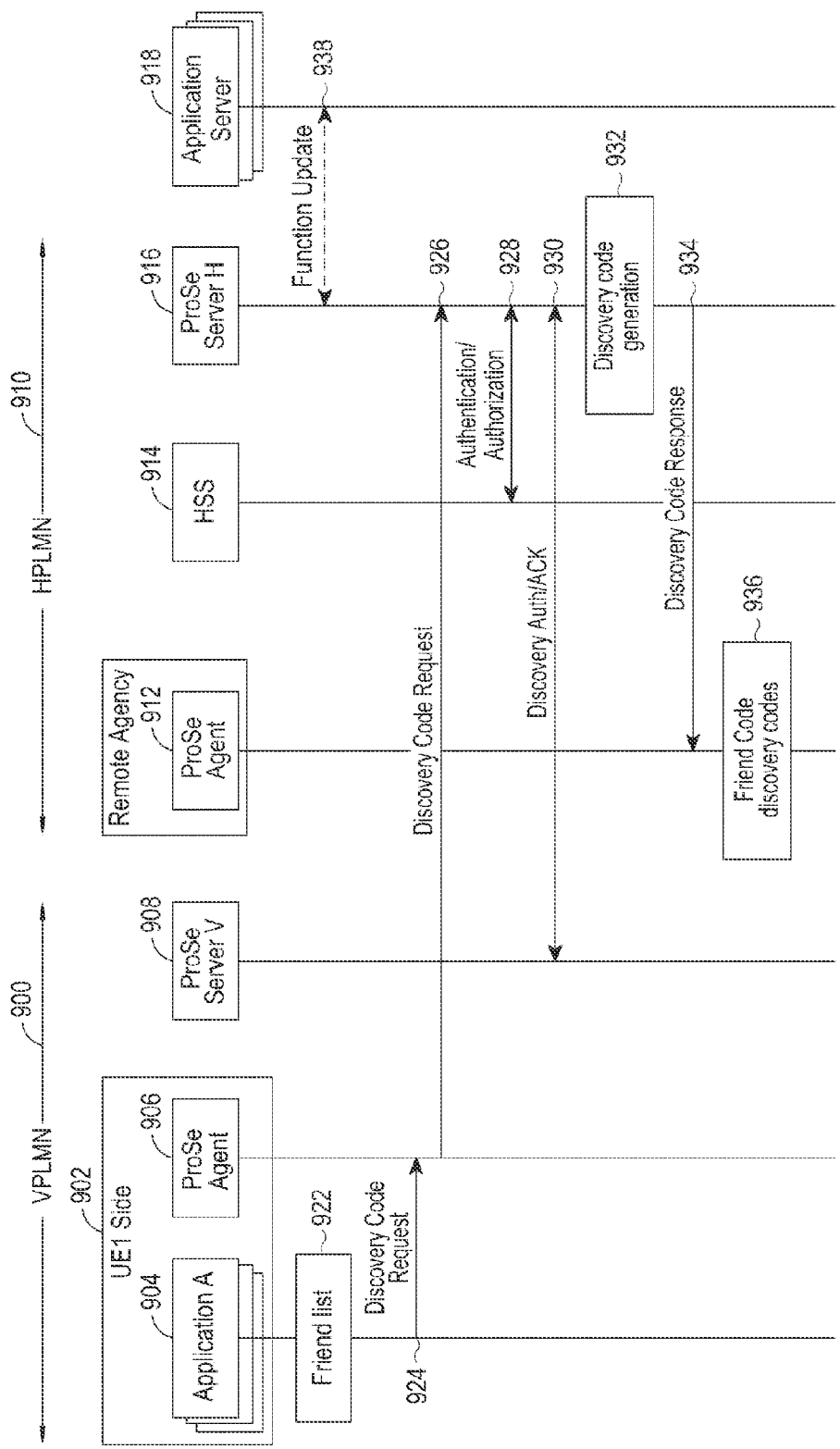
FIG. 9 is a diagram illustrating a signal flow for a method for performing discovery using an agent entity on behalf of a roaming D2D UE according to an embodiment of the present disclosure.

FIG. 9 is a diagram illustrating a signal flow for a discovery method using an agent for a roaming D2D UE according to an embodiment of the present disclosure.

Referring to FIG. 9, a Visitor Public Land Mobile Network (VPLMN) 900 and a Home Public Land Mobile Network (HPLMN) 910 include ProSe servers. The ProSe servers are a ProSe server V 908 for the VPLMN 900 and a ProSe server H 916 for the HPLMN 910.

At operation 938, the ProSe server H 916 may periodically update functions by communicating with an application server 918.

It is assumed that a first UE (UE1) 902 is roaming and being serviced from a network of another operator (e.g., a network of an operator to which UE1 902 has not subscribed) (e.g., the VPLMN 900).

The UE1 902 may include at least one application 904 and a ProSe agent 906. The application 904 receives a user command through a user interface and generates a signal. The ProSe agent 906 may convert the signal received from the application 904 to a form transmittable by broadband communication according to a broadband communication protocol. For example, the ProSe agent 906 may include middleware between the application 904 and the broadband communication protocol.

At operation 922, the application 904 of the UE1 902 may store information to be used. For example, a friend list, a group ID, bookmarked addresses, and/or the like may be stored in an area of the application 904.

At operation 924, a discovery command is generated. For example, at operation 924, the application 904 transmits a Discovery Code Request message to the ProSe agent 906.

If a discovery command is generated in the application 904 and thus the application 904 transmits a Discovery Code Request message to the ProSe agent 906 in the UE1 902 in operation 924, then at operation 926, the UE1 902 transmits a Discovery Code Request message to the ProSe server H 916 of the HPLMN 910 in operation 926. Because the UE1 902 is roaming in the VPLMN 900, at operation 926, the UE1 902 transmits a Discovery Code Request message to the D2D controller 306 belonging to the HPLMN 910.

The UE1 902 may perform discovery using an agent entity based on the decision of the ProSe agent 906 or an arbitrary criterion according to the present disclosure. The arbitrary criterion may be geographical proximity, request of an application or a user, or the decision of the ProSe agent 906. For example, if the ProSe agent 906 receives a discovery command and determines that a geographical location for discovery is not near to an area thereof, the ProSe agent 906 may determine to use an agent entity and request an agent entity to the ProSe server H 916.

The Discovery Code Request message may include an ID list of UEs to be discovered, such as a friend list, as well as the App ID of the UE1 902. Specifically, the Discovery Code Request message may include all or a part of IEs such as Remote Agency Command, Discovery Target Information, and Discovery Information.

The Remote Agent Command may include information about a category (or type) of a discovery operation that the agent entity will perform.

Location-related information as an example of the Discovery Target Information refers to geographical information about a target discovery area and may include information such as GPS information or an address (e.g., an administrative address). The Discovery Target Information includes one or more target IDs under circumstances, thus designating a remote agency. For example, the target ID may be at least one of an App ID, a ProSe user group ID, and a phone number.

At operation 928, upon receipt of the Discovery Code Request message, the ProSe server H 916 of the HPLMN 910 may request authentication to an HSS 914 to process UE authentication and determine whether the UE1 902 is authorized for agent-based discovery. Herein the HSS 914 may transmit the ID of the VPLMN 900 in which the UE1 902 is roaming to the ProSe server H 916.

After the authentication of the UE1 902, at operation 932, the ProSe server H 916 of the HPLMN 910 may generate a code for use in discovery. At operation 930, the ProSe server H 916 of the HPLMN 910 may transmit a Discovery Authentication message (a result or ACK) to the ProSe server V 908 of the VPLMN 900, when needed. The Discovery Authentication may include the App ID, the generated discovery code, a UE ID, and/or the like.

The ProSe server H 916 of the HPLMN 910 may recognize that the UE1 902 wants agent-based discovery by interpreting the Remote Agent Command field and may select an agent entity 912 based on the Discovery Target Information. At operation 934, after selecting the agent entity, the ProSe server H 916 may transmit a Discovery Code Response message including the generated discovery code to the selected agent entity 912.

At operation 936, the agent entity 912 may store information included in the Discovery Code Response message, such as the discovery code or a friend list.

If the Discovery Target Information indicates a location within the area managed by the ProSe server H 916, the ProSe server H 916 may select an agent entity, taking into account a geographical condition or load balancing. In the case of an indoor agent entity, the ProSe server H 916 may select the indoor agent entity referring to a database registered to the ProSe server H 916.

Optionally, if the Discovery Target Information indicates a location outside the area managed by the ProSe server H 916, the ProSe server H 916 may request selection of an agent entity for discovery to another ProSe server that covers the location indicated by the Discovery Target Information by transmitting a Remote Discovery Request message. The Remote Discovery Request message may include information included in the Discovery Code Request message. Upon receipt of the Remote Discovery Request message, the other ProSe server may select an agent entity according to the same criterion as used in the ProSe server H 916.

A subsequent operation to the selection of the agent entity 912 for the roaming UE is performed in a similar manner to in FIG. 8B and thus will not be described herein in detail.

It is to be clearly understood that the system configurations, the methods, the device structures, and the signal flows between entities in the system according to various embodiments of the present disclosure as described in relation to FIGS. 1 to 9 do not limit the scope of the present disclosure. For example, all components or operations described in relation to FIGS. 1 to 9 should not be interpreted as essential to implementation of various embodiments of the present disclosure. Even with a part of the components or operations, various embodiments of the present disclosure may be implemented without departing the spirit and scope of the present disclosure.

The proposed discovery method in a communication network may be implemented as computer-readable code in a non-transitory computer-readable recording medium. The non-transitory computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and/or the like, and may also include the medium that is implemented in the form of carrier waves (e.g., transmission over the Internet). In addition, the non-transitory computer-readable recording medium may be distributed over the computer systems connected over the network, and computer-readable codes may be stored and executed in a distributed manner.

As is apparent from the foregoing description, real-time, locally customized information can be achieved, overcoming geographical limitations of discovery.

Further, because various embodiments of the present disclosure are implemented even in a legacy UE, the number of UEs that are allowed to participate in D2D discovery can be increased and thus D2D discovery efficiency can be increased.

In addition, agent-based discovery is available to a roaming UE in the embodiments of the present disclosure.

Although the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for extending proximity service at a terminal in a communication system, the method comprising:
   generating a discovery request message including discovery target information;
   transmitting the discovery request message to a server that supports a proximity service for the terminal and another terminal; and
   receiving information obtained by a discovery operation from an agent entity that performs the discovery operation with the other terminal on behalf of the terminal using identification information of the terminal,
   wherein the agent entity is determined to be in proximity of the other terminal based on the discovery target information.

2. The method of claim 1, wherein the discovery request message further includes information about a type of the discovery operation.

3. The method of claim 1, wherein the discovery target information includes at least one of location information of the terminal, a phone number of the terminal, or identification information of an application requesting the discovery operation.

4. The method of claim 1, wherein the received information is one of an acknowledgement and an identifier of the other terminal.

5. A method for extending proximity service of a terminal at a server supporting the proximity service for the terminal and another terminal in a communication system, the method comprising:
   receiving a discovery request message including discovery target information from the terminal;
   determining an agent entity for performing a discovery operation with the other terminal on behalf of the terminal using identification information of the terminal; and
   transmitting, to the determined agent entity, a discovery indication message to request performing the discovery operation of the terminal,
   wherein the agent entity is determined to be in proximity of the other terminal based on the discovery target information.

6. The method of claim 5, wherein the discovery request message further includes information about a type of the discovery operation.

7. The method of claim 5, wherein the discovery target information includes at least one of location information of the terminal, a phone number of the terminal, or identification information of an application requesting the discovery operation.

8. The method of claim 5,
   wherein the discovery indication message is a discovery code response message, and
   wherein the discovery code response message includes the identification information of the terminal.

9. The method of claim 5, further comprising:
   transmitting, if a target discovery location for the terminal is not included in coverage of the server or if the terminal is roaming in a network of another network operator, a remote discovery request message to another server configured to support the target discovery location.

10. The method of claim 9, wherein the other server is further configured to determine the agent entity for performing the discovery operation on behalf of the terminal.

11. A method for extending proximity service of a terminal at an agent entity in a communication system, the method comprising:
receiving a discovery indication message requesting a discovery operation from a server that supports a proximity service for a terminal and another terminal;
transmitting a first discovery signal to the other terminal on behalf of the terminal using identification information of the terminal included in the discovery indication message;
receiving a second discovery signal from the other terminal on behalf of the terminal; and
transmitting, to the terminal, information obtained from the second discovery signal,
wherein the agent entity is determined by the server to be in proximity of the other terminal based on discovery target information generated by the terminal.

12. The method of claim 11, wherein the discovery indication message is a discovery code response message.

13. The method of claim 11, wherein each of the first discovery signal and the second discovery signal is one of a gathering-type discovery signal and a discovery-type discovery signal.

14. The method of claim 11, wherein the discovery identification information identifies the terminal or a terminal that the terminal wants to discover.

15. The method of claim 11, wherein the obtained information from the second discovery signal is one of an acknowledgement and an identifier of the other terminal.

16. A terminal for extending proximity service in a communication system, the terminal comprising:
a controller configured to:
generate a discovery request message including discovery target information,
control transmission of the discovery request message to a server that supports a proximity service for the terminal and another terminal, and
control reception of information obtained by a discovery operation from an agent entity that performs the discovery operation with the other terminal on behalf of the terminal using identification information of the terminal; and
a transceiver configured to transmit and receive wireless signals under control of the controller,
wherein the agent entity is determined to be in proximity of the terminal based on the discovery target information.

17. The terminal of claim 16, wherein the discovery target information includes at least one of location information of the terminal, a phone number of the terminal, or identification information of an application requesting the discovery operation.

18. The terminal of claim 16, wherein the received information is one of an acknowledgement and an identifier of the other terminal.

19. A server for extending proximity service of a terminal, the server supporting the proximity service for the terminal and another terminal in a communication system, the server comprising:
a controller configured to:
control reception of a discovery request message including discovery target information from the terminal,
determine an agent entity for performing a discovery operation with the other terminal on behalf of the terminal using identification information of the terminal, and
control transmission to the determined agent entity of a discovery indication message to request performing the discovery operation of the terminal; and
a transceiver configured to transmit and receive wireless signals under control of the controller,
wherein the agent entity is determined to be in proximity of the other terminal based on the discovery target information.

20. The server of claim 19, wherein the discovery request message further includes information about a type of the discovery operation.

21. The server of claim 19, wherein the discovery target information includes at least one of location information of the terminal, a phone number of the terminal, or identification information of an application requesting the discovery operation.

22. The server of claim 19,
wherein the discovery indication message is a discovery code response message, and
wherein the discovery code response message includes the identification information of the terminal.

23. The server of claim 19, wherein the controller is further configured to control transmission of a remote discovery request message to another server configured to support the target discovery location if a target discovery location for the terminal is not included in coverage of the server or if the terminal is roaming in a network of another network operator.

24. The server of claim 23, wherein the other server is further configured to determine the other agent entity for performing the discovery operation on behalf of the terminal if the target discovery location for the terminal is not included in coverage of the server.

25. An agent entity for extending proximity service of a terminal in a communication system, the agent entity comprising:
a controller configured to:
control reception of a discovery indication message requesting a discovery operation from a server that supports a proximity service for a terminal and another terminal,
control transmission of a first discovery signal to the other terminal on behalf of the terminal using identification information of the terminal included in the discovery indication message,
control reception of a second discovery signal from the other terminal on behalf of the terminal, and
control transmission of information obtained from the second discovery signal to the terminal; and
a transceiver for transmitting and receiving wireless signals under control of the controller,
wherein the agent entity is determined by the server to be in proximity of the other terminal based on discovery target information generated by the terminal.

26. The agent entity of claim 25, wherein the discovery indication message is a discovery code response message.

27. The agent entity of claim 25, wherein each of the first discovery signal and second discovery signal is one of a gathering-type discovery signal and a discovery-type discovery signal.

28. The agent entity of claim 25, wherein the discovery identification information identifies the terminal or a terminal that the terminal wants to discover.

29. The agent entity of claim 25, wherein the obtained information from the second discovery signal is one of an acknowledgement and an identifier of the other terminal.

* * * * *